United States Patent [19]

Pano

[11] Patent Number: 5,076,739
[45] Date of Patent: Dec. 31, 1991

[54] CUTTING INSERT HAVING A CHIP FORMER

[75] Inventor: Joseph Pano, Nahariya, Israel
[73] Assignee: Iscar Ltd., Tefen, Israel
[21] Appl. No.: 578,061
[22] Filed: Sep. 5, 1990

[30] Foreign Application Priority Data

Sep. 8, 1989 [IL]  Israel ......................................... 91575

[51] Int. Cl.⁵ .............................................. B23P 15/30
[52] U.S. Cl. .................................... 407/116; 407/114; 407/117
[58] Field of Search ................................. 407/113–117

[56] References Cited

U.S. PATENT DOCUMENTS 4,776,733 10/1988 Pettersson ............................ 407/114
4,992,008 2/1991 Pano ...................................... 407/114

FOREIGN PATENT DOCUMENTS

89/01375 2/1989 World Int. Prop. O. ............ 407/116

*Primary Examiner*—Steven C. Bishop
*Attorney, Agent, or Firm*—Burgess, Ryan and Wayne

[57] ABSTRACT

A metal cutting insert having an arcuately shaped cutting edge; a rake surface extending inwardly from the cutting edge and chip forming means located inwardly of said rake face; and comprising a pair of curved chip deflector surfaces sloping uniformly and smoothly away from said rake surface towards respective deflector surface peaks; the deflector surfaces being concavely curved in an axial direction and convexly curved in a lateral direction; a valley portion extending longitudinally and centrally between said deflector surfaces; the deflector surfaces sloping uniformly away from said side relief flanks towards said valley portion in a direction towards the bottom face so as to merge smoothly with said valley portion via smoothly curved corners; the lateral extent of each deflector surface diminishing uniformly from a maximum adjacent said rake surface to a minimum adjacent the respective surface peak.

3 Claims, 3 Drawing Sheets

CUTTING INSERT HAVING A CHIP FORMER

FIELD OF THE INVENTION

This invention relates to metal cutting tools for use in parting, grooving and turning operations and, in particular, to metal cutting inserts for use with such cutting tools.

BACKGROUND OF THE INVENTION

Known cutting inserts for use with such metal cutting tools are formed with top and bottom faces and front and side relief flanks, with a cutting edge defined between the intersection of the front relief flank and the top face, the top face including a rake surface and chip forming means for suitably shaping and diverting the chips formed during the cutting operation so as to facilitate the breakage and removal thereof without damage to the workpiece and cutting tool and without danger to the tool operator.

The chip forming means are generally designed to narrow the chip, so as to ensure that in grooving or parting operations the chip flows smoothly through the cutting region and also, to some extent, to rigidize the chip so as to facilitate its subsequent deflection and compacting in spiral form and eventual breakage.

It will be realised that the entire process of chip forming, shaping and deflection, involving as it does the continuing abutment in movement of the chip with the chip forming means, is accompanied by forces which tend to resist the movement of the chip and, in order to overcome these forces, the cutting operations are accompanied by increased power requirements. There is, therefore, in consequence a relatively increased generation of heat during the cutting operation which leads to an increased heating, on the one hand, of the cutting insert and cutting tool and, on the other hand, of the workpiece.

Whilst such increased heating of the cutting insert may itself lead to increasing wear of the cutting insert and necessitate its frequent replacement, the increased heating of the workpiece can be particularly undesirable in the case of workpieces made of stress hardening materials, i.e. materials wherein excessive heating leads to the generation of undesirable stresses and these stresses, in their turn, lead to an undesirable hardening of the material. Thus, with such stress hardening materials (examples of which include stainless steel and so-called space alloys), the hardening of the material as a result of heat-induced stresses generated during an initial cutting operation, results in the hardening of the material, rendering the subsequent cutting operation more difficult, with a greater power requirement.

Thus, with such stress hardening materials, efforts should be directed in the design of the cutting tool to ensure that the cutting operation is accompanied by a minimum amount of heat and, in this connection, the heat generated during the chip forming should be reduced to a minimum.

It is known, in this connection, that the more highly positive is the cutting edge, the less heat is generated. It is, however, not possible to render the cutting edge unduly highly positive, seeing that this inevitably results in an undesirable weakening of the cutting edge and requiring its frequent replacement. The use of low feed rates, on the other hand, results in the formation of relatively thin chips and it is known that with such relatively thin chips special chip forming means have to be provided in order to ensure the effective shaping and disposal of these thin chips.

BRIEF SUMMARY OF THE INVENTION

It is an object of the present invention to provide a new and improved cutting insert for use in a metal cutting tool, wherein the above-referred-to disadvantages are substantially reduced.

According to the present invention, there is provided a metal cutting insert having top and bottom faces and front and side relief flanks; an arcuately-shaped cutting edge defined at the intersection of said front relief flank and said top face and being concave with respect to the top face; said top face comprising a rake surface extending inwardly from said cutting edge and chip forming means located inwardly of said rake face; characterised in that said cutting edge is positive at least in a central position thereof; said chip forming means comprises a pair of curved chip deflector surfaces, sloping uniformly and smoothly away from said rake surface in a direction away from said bottom face and towards respective deflector surface peaks; said deflector surfaces being concavely curved in an axial direction and convexly curved in a lateral direction; and a valley portion extending longitudinally and centrally between said deflector surfaces; said deflector surfaces sloping uniformly away from said side relief flanks towards said valley portion in a direction towards the bottom face so as to merge smoothly with said valley portion via smoothly curved corners; and lateral extent of each deflector surface diminishing uniformly from a maximum adjacent said rake surface to a minimum adjacent the respective surface peak.

With such a cutting insert, the chip which has been generated at the cutting edge is already provided with a relatively narrowed lateral extent owing to the concave shape of the cutting edge, and then proceeds, under the influence of the cutting forces, over the rake surface and onto the curved chip deflector surfaces, passing from the rake surface to the chip deflector surface in a smooth, continuous movement. Owing to the particular curved nature of the chip deflector surface, it is ensured that the chip contacts these surfaces over their entire length in a tangential form of contact, being supported by the chip deflector surfaces at its side and being forced downwardly into the valley portion under the influence of the cutting forces. In this way, the central axial portion of the chip becomes suitably deformed but the entire deformation, shaping and deflection of the chip is achieved with a minimum exertion of forces and therefore with a minimum heating of the cutting tool and the workpiece.

In this way, the cutting tool is effective in cutting operations on stress hardening workpieces, particularly at low feed rates.

BRIEF SUMMARY OF THE DRAWINGS

One embodiment of a cutting insert in accordance with the present invention will now be described by way of example and with reference to the accompanying drawings, in which.

DETAILED DESCRIPTION OF PREFERRED EMBODIMENT

Figure 1:
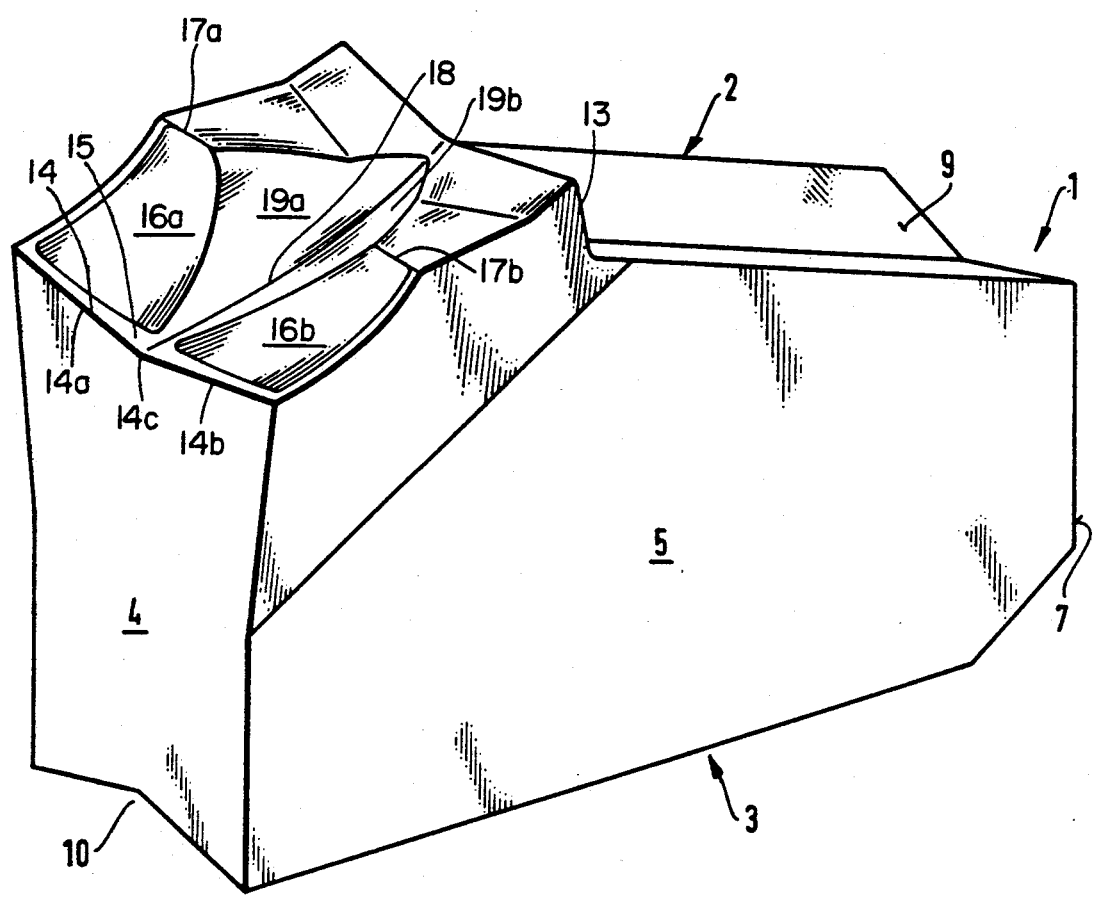
FIG. 1 is a perspective view of the cutting insert.

As seen in the drawings, a cutting insert 1 is formed with top and bottom faces 2 and 3, a front relief flank 4, side relief flanks 5 and 6 and a rear face 7.

The insert 1 is formed with a rear, wedge-shaped body portion facilitating its wedge clamping in an appropriately wedge-shaped recess formed in an insert holder 8 (seen in FIG. 2), the wedge-shaped body portion being formed with upper and lower V-shaped clamping grooves 9 and 10 in which are fitted V-shaped ribs of holder clamping jaws 11 and 12. The insert is provided with an abutting shoulder 13 designed to abut the front end of the clamping jaw 11, thereby limiting the degree of insertion of the insert into the holder 8.

Figure 4:
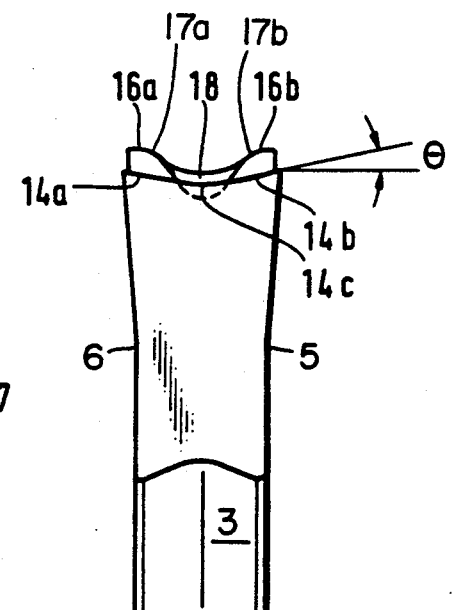
FIG. 4 is a front elevation of the insert.

A cutting edge 14 is defined at the intersection of the front relief flank 4 and the top face 2 and is of generally arcuate shape, being concave with respect to the top face 2 and comprising two side portions 14a and 14b which slope respectively downwardly towards the bottom face 3 at an angle $\theta$ (see FIG. 4) with respect to a plane parallel to the bottom face 3, the two side portions 14a and 14b merging via a central curved portion 14c.

Figure 6:
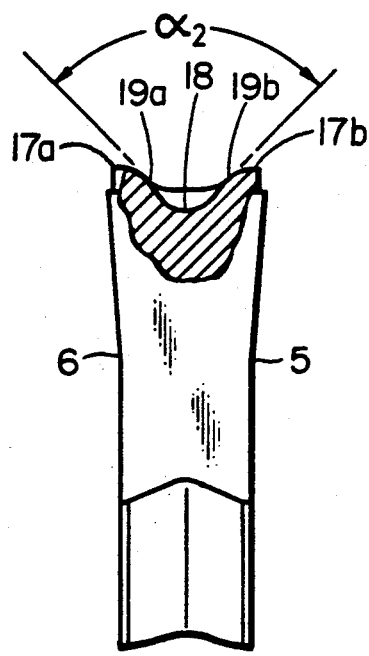
FIG. 6 is a cross-sectional view of the insert shown in FIG. 3 taken along the line VI—VI.
Figure 5:
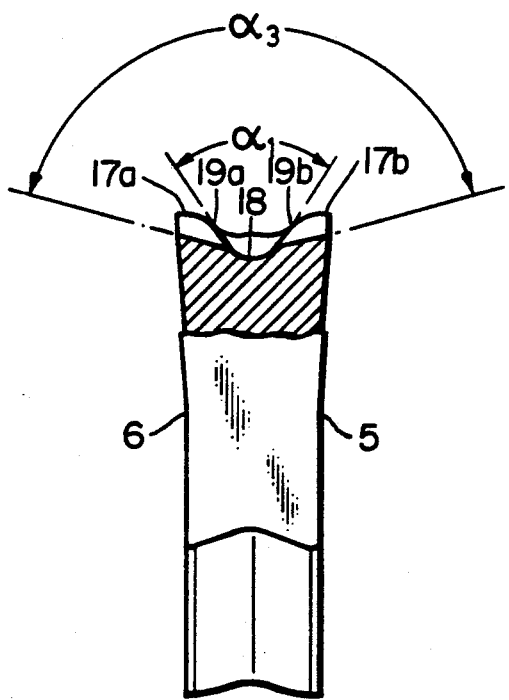
FIG. 5 is a cross-sectional view of the insert shown in FIG. 3 taken along the line V—V.

A rake face 15 extends from the cutting edge 14 and merges smoothly and continuously with a pair of curved chip deflector surfaces 16a and 16b. As can be clearly seen in FIG. 1 of the drawings, the chip deflector surfaces are concavely curved in an axial direction and, as can be seen in FIGS. 5 and 6 of the drawings, are convexly curved in a lateral direction. The chip deflector surfaces 16a and 16b slope uniformly and smoothly away from the rake surface 15 in a direction away from the bottom face 3 towards respective deflector surface peaks 17a and 17b.

Formed centrally in the top face and extending axially thereof, is a valley portion 18 having side walls 19a and 19b which define an angle $\alpha$ between them. The side walls 19a and 19b merge smoothly with the chip deflector surfaces 16a and 16b at respectively smoothly curved corners. As can be clearly seen in FIGS. 5 and 6 of the drawings, the angle $\alpha$ steadily increases along the length of the valley portion extending from the cutting edge from a value $\alpha_1$ (see FIG. 5) close to the cutting edge to a larger value $\alpha_2$ (see FIG. 6) remote from the cutting edge. This steady increase in the angle $\alpha$ subtended by the side walls of the valley portion carries with it the consequence that the actual lateral extent of the chip deflector surfaces 16a and 16b diminishes uniformly from a maximum adjacent the rake surface 15 to a minimum adjacent the respective peaks 17a and 17b.

Figure 2:
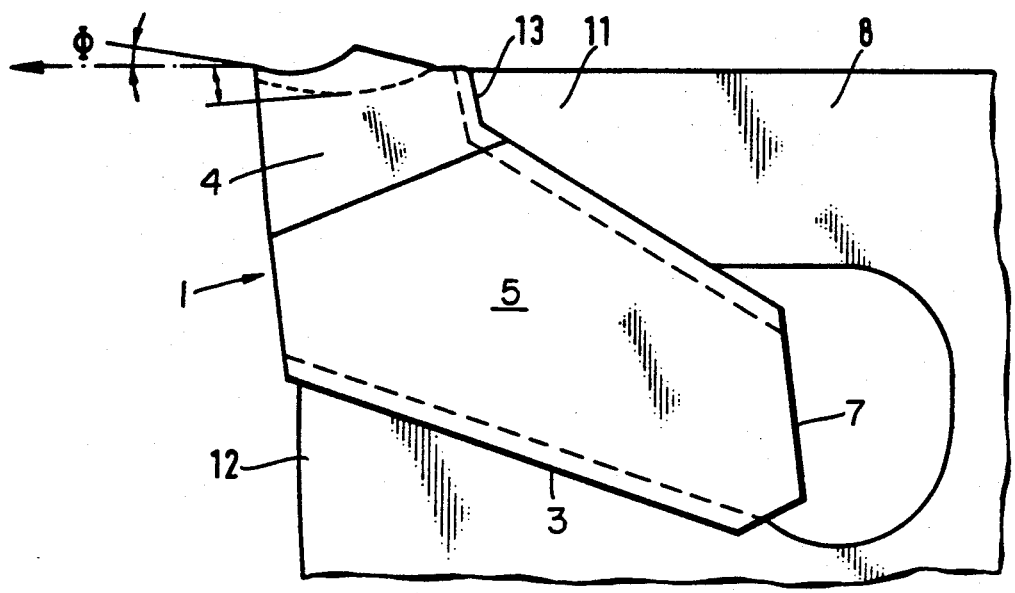
FIG. 2 is a side elevation of the insert shown mounted in an insert holder.
Figure 3:
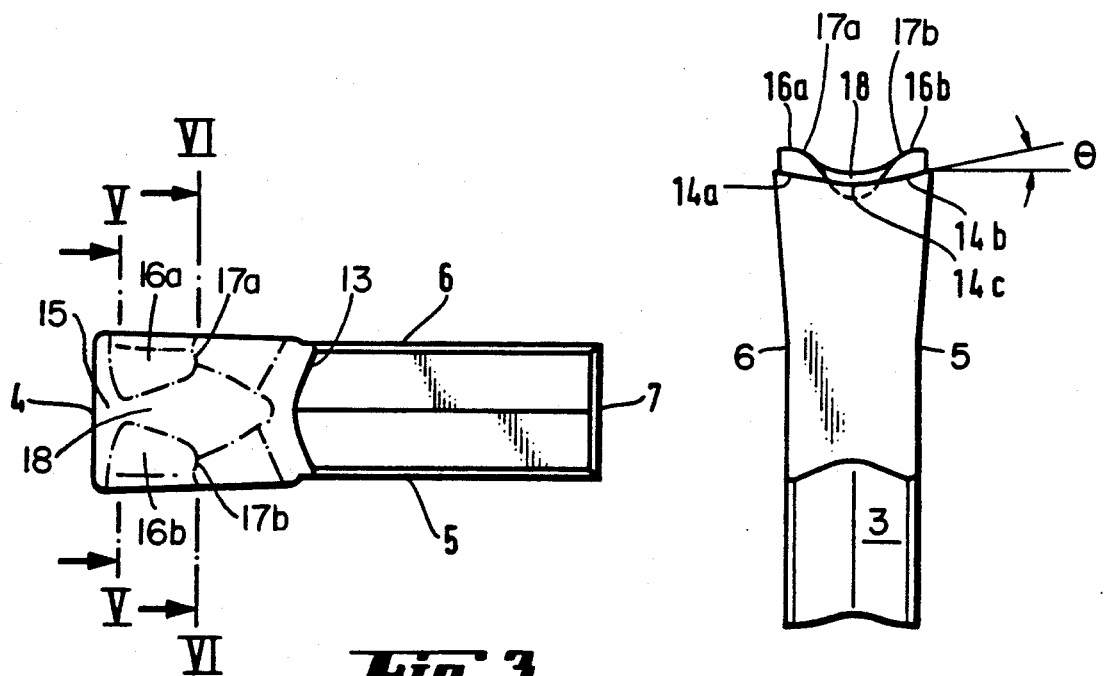
FIG. 3 is a plan view from above of the insert.

As can be seen in FIG. 2 of the drawings, the cutting edge 14 is formed with a rake angle $\Phi$ which varies along the length of the cutting edge from a relatively high positive value at the central portion 14c of the cutting edge (for example, 20°), to a lesser positive, or even slightly negative value, at the respective corners of the cutting edge (for example, 10° positive or negative). FIG. 5 shows the angle $\alpha_3$ subtended by the respective side portions of the rake surface adjacent the cutting edge. This relatively large angle reflects the fact that the rake angle changes from a highly positive value in the central portion of the rake surface to a much less positive or even negative value adjacent the corners.

When used in a metal cutting operation such as, for example, parting or grooving, the chip which is formed at the cutting edge is immediately given an arcuate cross-sectional shape owing to the arcuate shape of the cutting edge and smoothly passes over the rake surface onto the chip deflector surfaces, contacting the latter substantially tangentially. Whilst the side portions of the chip are respectively supported by the chip deflector surfaces, the central portion thereof which moves over the valley portion is deformed downwardly under the cutting forces so as to acquire an appropriately deformed central depression. In this way, the chip is effectively narrowed and rigidized and curls into a required disposition, whereupon it breaks either as a result of impacting the workpiece or as a result of the internal stresses present consequent upon the curving.

It will be appreciated that by virtue of the particular construction of the chip forming means and the fact that the chip passes into contact with the chip deflector surfaces over very smoothly sloping surfaces, the tangential contacting of the chip with these surfaces introduces minimal stresses and therefore results in relatively low heat generation. The cutting insert is therefore particularly useful when cutting stress hardening materials, seeing that minimal stresses are introduced into the materials as a result of the cutting operation. Furthermore, and particularly when using stress hardening materials where low feed rates are indicated, the particular construction just described is effective in the shaping of relatively thin chips produced with such low feed rates and thereby effectively contributes to the control and removal of such chips.

Furthermore, the fact that the cutting edge is provided at its central portion with a highly positive rake angle, whilst at its sensitive corner portions the rake angle is very much less positive or even negative, contributes, on the one hand, to the effective cutting operations with minimal introduction of stresses and, on the other hand, lessens the wear and damage to the cutting edge which would occur when the cutting edge is uniformly negative along its entire extent.

I claim:

1. A metal cutting insert having top and bottom faces and front and side relief flanks; an arcuately shaped cutting edge defined at the intersection of said front relief flank and said top face and being concave with respect to the top face; said top face comprising a rake surface extending inwardly from said cutting edge and chip forming means located inwardly of said rake face; wherein said cutting edge is positive at least in a central portion thereof; said chip forming means comprises a pair of curved chip deflector surfaces sloping uniformly and smoothly away from said rake surface in a direction away from said bottom face and towards respective deflector surface peaks; said deflector surfaces being concavely curved in an axial direction and convexly curved in a lateral direction; a valley portion extending longitudinally and centrally between said deflector surfaces; said deflector surfaces sloping uniformly away from said side relief flanks towards said valley portion in a direction towards the bottom face so as to merge smoothly with said valley portion via smoothly curved corners; the lateral extent of each deflector surface diminishing uniformly from a maximum adjacent said rake surface to a minimum adjacent the respective surface peak.

2. A metal cutting insert according to claim 1, wherein said cutting edge is significantly less positive at its terminal portions than at its central portion.

3. A metal cutting insert according to claim 1, wherein said cutting edge is substantially negative at its terminal portions.

* * * * *